United States Patent [19]
Clausi et al.

[11] 3,889,002
[45] June 10, 1975

[54] SPOONABLE FROZEN GELATIN DESSERT CONCENTRATE

[75] Inventors: Adolph Scott Clausi, Cos Cob, Conn.; Martin Glicksman, Valley Cottages; Elizabeth Farkas, Yonkers, both of N.Y.

[73] Assignee: General Foods Corporation, White Plains, N.Y.

[22] Filed: June 8, 1973

[21] Appl. No.: 368,150

[52] U.S. Cl............................................ 426/576
[51] Int. Cl............................. A23l 1/04; A23l 1/06
[58] Field of Search............................ 426/168, 350

[56] References Cited
UNITED STATES PATENTS

| | | | |
|---|---|---|---|
| 241,486 | 5/1881 | Gardiner | 426/168 |
| 2,183,084 | 12/1939 | Reynolds | 426/350 |
| 2,459,431 | 1/1949 | Johnson | 426/350 |
| 2,704,269 | 3/1955 | Tice | 426/350 |

*Primary Examiner*—A. Louis Monacell
*Assistant Examiner*—J. M. Hunter
*Attorney, Agent, or Firm*—Daniel J. Donovan; Bruno P. Struzzi; Doris M. Bennett

[57] ABSTRACT

A spoonable frozen or shelf-stable concentrate which when diluted with hot tap water and thereafter refrigerated produces a gelatin-type dessert.

11 Claims, No Drawings

SPOONABLE FROZEN GELATIN DESSERT CONCENTRATE

SUMMARY OF THE INVENTION

This invention relates to the preparation of a spoonable gelatin concentrate capable of being frozen or stored at room temperature, which concentrate, when placed in water of a moderate temperature readily dissolves therein. More specifically, this invention pertains to a novel method of preparing a readily soluble, spoonable gelatin concentrate by soaking the gelatin in a cold polyhydric alcohol.

Gelatin, like other hydrophilic colloids, is essentially soluble in water at moderate temperatures of, for example, 80°F. However, when large amounts of this colloid are attempted to be solubilized in water at this temperature, the gelatin does not readily go into solution. Thus it is with gelatin desserts that a substantial increase in the temperature of the water is necessary in order that the gelatin dessert mixture dissolve and subsequently gel to form a homogeneous dessert of desired texture. The increased temperature required to dissolve the gelatin requires up to 4 hours of refrigeration for the dessert to gel.

There have been numerous methods suggested for improving the solubility of gelatin, chief among them being those methods which teach combining gelatin with a polyhydric alcohol or ester thereof. For example, in U.S. Pat. No. 2,558,065 issued June 26, 1951, a polyhydric alcohol such as glycerine is poured over the gelatin in proportions providing a 30 – 55 percent concentration by weight of gelatin in the resulting mixture, after which a vacuum is applied until the glycerine has wetted all of the granules of the gelatin. This method requires subsequent heating of the polyhydric alcohol and gelatin mixture to temperatures of about 80°C to 100°C until the solution of gelatin in glycerine is complete. When the solution is cooled to room temperature, it hardens to a viscous gelatinous mass of sliceable consistency. Although this method of allowing the gelatin to completely solubilize in glycerine yields a glycerinated gelatin large quantities of which are soluble in aqueous systems, the consistency of the resultant product is such that it lacks both the desirable solubility in water appreciably below boiling temperatures and the degree of viscosity necessary for use as a spoonable gelatin concentrate.

Similarly, in U.S. Pat. No. 2,819,970, it was suggested that the gelatin be coated with a dispersant such as a silicone, esters of polyhydric alcohols and fatty acids. However, a major shortcoming in the use of such compounds is that solutions in which they are used acquire a cloudy character, making them particularly undesirable for gelatin dessert-type products.

The principal objects of this invention will be more readily apparent in the concluding portion of this application.

SUMMARY OF THE INVENTION

It has been found that by soaking gelatin in a polyhydric alcohol of a temperature not exceeding room temperature for a specific period of time, a gelatin which is readily soluble and dispersible in hot tap water is obtained which, when mixed with other ingredients of a gelatin dessert-type nature and allowed to stand at room temperature for a short period, yields a spoonable gelatin dessert concentrate which may either be frozen or retained as a shelf stable product. When dissolved in hot water and thereafter refrigerated, a completely gelled dessert is derived in about one quarter of the time required by the conventional gelatin dessert product due at least in part to having eliminated the need of dissolving the gelatin in boiling water.

The behavioral characteristics of gelatin with regards to its poor solubility in water indicates a fundamental arrangement of its molecular structure whereby the amino acid radicals are joined together by peptide linkages in chains of varying lengths and molecular weights. Due to this structural configuration therefore, the granulated gelatin when placed in cold water, tends to imbibe the same and remain as discrete swollen particles rather than dissolving therein.

The present invention is based on the fact that gelatin imbibes a cold polyhydric alcohol in much the same way as it does water which accounts for the low solubility of gelatin in the latter. To date, polyhydric alcohols have been regarded as poor dispersants for gelatin since they tend to dissolve hydrophilic colloids as a whole (U.S. Pat. No. 3,364,036 issued Jan. 16, 1968). However, it has been found that when the gelatin is allowed to absorb the polyhydric alcohol for a period of time sufficient for the gelatin granules to become swollen but prior to actual dissolution in the alcohol, the gelatin, when dispersed in hot tap water is readily soluble and enjoys a degree of viscosity appropriate for use as a spoonable gelatin concentrate. It is theorized that this increased solubility is due to the particles being swollen by the glycerine so that much more surface area of the gelatin particles is in contact with the water thus increasing the rate of solution of the gelatin into the water phase. In addition since glycerine and other polyhydric alcohols are strongly hydrophilic due to the presence of numerous hydroxyl groups in their chemical structures, their presence on the surface of the gelatin particles also enables them to function as a bridge between gelatin and water thus increasing the rate of solubility. In addition, when the swollen gelatin composition is stored at temperatures not exceeding room temperature, it provides a stable product with no tendency for the gelatin to be dissolved by the polyhydric alcohol, a result which could not have been anticipated from existing facts concerning the behavior of gelatin in the same. Although a wide range of hydrophilic colloids have not been tested, it is foreseeable that such colloids, especially those having a molecular configuration closely resembling gelatin, and thus demonstrating similar solubility problems, would demonstrate similarly improved solubility by the practice of this invention.

The composition of the present invention is, in its basic form, therefore, a hydrophilic colloid impregnated with a cold polyhydric alcohol to a swollen state so as to obtain a thick, stirrable suspension having a bead-like appearance that is easily cleaved with a spoon and readily soluble in hot tap water, "suspension" in this context referring to the polyhydric alcohol being "suspended" or encapsulated in the gelatin granule rather than the conventional definition of the term which would indicate that the gelatin granules were suspended in the polyhydric alcohol. As far as commercial applications are concerned, the preferred colloid of this invention is gelatin, since this colloid is in wide use for forming gelatin desserts and the principle component of the dessert concentrate of this invention. Of the polyhydric alcohols, glycerine has been found to be the most desirable in terms of having the least affect on the taste of the resulting product.

The features of this invention which are believed to be novel are distinctly set forth and claimed in the concluding portion of this specification.

DESCRIPTION OF THE INVENTION

Although the method of this invention may be practiced on a wide range of hydrophilic colloids such as carrageenan, furcellaran, agar, and the like in order to obtain a hydrophilic colloid which is soluble in water appreciably below boiling temperature and at the same time of an easy-to-work-with consistency, the preferred use of this invention is as a gelatin dessert concentrate. Hence, further discussion will be directed solely to the use of gelatin but is not intended to limit the scope of this invention.

The composition of this invention is prepared by soaking a gelatin in a polyhydric alcohol, the temperature of the alcohol as well as duration of soaking in the same being critical to this invention. It has been found that the gelatin must be soaked in a polyhydric alcohol not exceeding room temperature for a period of time sufficient to allow the colloid granules to imbibe the alcohol and assume the appearance of discrete swollen particles or beads which requires a minimum time of about 1 hour. At the same time it is essential that the impregnating process not be so long as to allow the gelatin to appear solid and cohesive as this indicates that the gelatin has begun to dissolve in the alcohol. It is important that these parameters be strictly observed since an appreciable variance therefrom will result in a gelatin of either poor solubility and dispersibility or poor workability from a manufacturing as well as consumer standpoint. For example, if gelatin is soaked in glycerine for appreciably less than one hour or alternatively allowed to dissolve in the glycerine, the improved solubility in hot tap water will not be derived. Similarly, if the gelatin is soaked in glycerine exceeding ambient temperature, a tough rubbery ball which is less soluble and difficult to handle is obtained, making use of the same as a spoonable concentrate infeasible.

The ratio of gelatin to polyhydric alcohol may encompass a wide range but that most appropriate for this invention is 5:1 to about 1:3 by weight of the gelatin to alcohol since the gelatin inbibes all of the alcohol and thus eliminates the need for subsequent removal of any remaining "solvent," the final product having the appearance of a composition of discrete beads with the absence of any solvent. Both the liquid polyhydric alcohols and solutions of normally solid polyhydric alcohols may be utilized to achieve the desired result but glycerine is particularly preferred since it demonstrates the least off-taste of this class of alcohols. The preferred embodiment of this invention is therefore a 5:3 weight ratio of gelatin to glycerine.

The other product ingredients of the gelatin dessert concentrate of this invention such as the sucrose, food acids, flavoring and coloring may be added either while the gelatin is soaking in the alcohol for the initial one hour period or may be added at the conclusion of that period, in both instances the mixture being allowed to equilibrate at room temperature for an additional period of time usually an hour, being careful not to allow dissolution of the gelatin in the polyhydric alcohol to occur in either instance.

Although this invention is in the form of a spoonable concentrate it is easy to prepare the product in other convenient forms, i.e., a squeezable mass contained in a toothpaste-type tube, individual cubes or balls of convenient recipe sizes, etc. Similarly, fresh or cooked fruit may be added to the product for a fruited gelatin desserts. Where the fruited gelatin concentrate is to be used as a shelf-stable product, this would involve incorporating intermediate moisture fruits in order that both the desirable organoleptic qualities of the fruit as well as the overall stability of the product be maintained.

Accordingly, the resultant composition of this invention may be either frozen or maintained at room temperature as a shelf-stable product. In both instances, a readily dispersible, hot tap water-soluble product of a thick, stirrable consistency is obtained which when dissolved in water yields a consumable gelled product in about 45 minutes when refrigerated immediately after dissolution. This rate of gelation may be further excelled by placing the gelatin/glycerol composition in the freezer, where, unlike the conventional gelatin preparation, gelation occurs at a more rapid rate than the crystallization of the water and thus renders a completely gelled product in about 30 minutes.

In order to more fully explain the invention, the following illustrative examples are set forth.

EXAMPLE I

A 3:5 weight ratio of gelatin to glycerine (30:50 g) was prepared and allowed to stand at room temperature for 1 hour during which time the following ingredients were added:

| | |
|---|---|
| Sugar | 130 g |
| Citric Acid | 3 g |
| Water | 70 g |
| Flavor and color q.s (quantity sufficient) | |

At the completion of the first hour the entire mixture was allowed to stand for an additional hour at room temperature after mixing the gelatin/glycerol phase and ingredient phase together.

The mixture was refrigerated at 0°F and thereafter 2 teaspoonsful (30–40 gms) of the concentrate were stirred into 120 cc hot tap water (125°F). The concentrate dispersed within 1 minute and gradually went into solution upon standing. It was then refrigerated and ready to consume as a gelatin dessert in 45 minutes.

EXAMPLE II

The following ingredients were weighed out separately and the dry ingredients mixed prior to addition to the polyhydric alcohol solution:

| | |
|---|---|
| Gelatin | 50 g |
| Sucrose | 260 g |
| Citric Acid | 10 g |
| Water | 138 g |
| Flavor and color | q.s. (quantity sufficient) |
| Sorbitol (70% solution) | 42 g |

The entire mixture was allowed to stand for 1 hour at room temperature after which it was frozen for 24 hours at 0°F. For reconstituting, 60 grams of the gelatin composition was mixed with ½ cup of hot tap water (125°F) and refrigerated for 1 hour to yield a completely gelled dessert.

EXAMPLE III

The following dry ingredients were blended together:

| | |
|---|---|
| Sucrose | 260 g |
| Gelatin | 50 g |
| Citric acid | 10 g |
| Flavor and color q.s (quantity sufficient) | |

This dry mixture was subsequently added to a polyhydric alcohol solution comprising the following ingredients and concentrations:

| | |
|---|---|
| Mannitol (dry) | 30 g |
| Water | 180 g |

The same procedure was thereafter followed as in Example II and provided a completely gelled product in about 40 minutes.

EXAMPLE IV

In Example III, the mannitol was replaced by 30 g of 1,3-butylene glycol and the dry ingredients allowed to soak therein for 1 hour after which it was frozen at 0°F. It was then evaluated as in Example II. The same desirable spoonable gelatin concentrate was derived which, when dissolved in hot tap water of approximately 125°F and refrigerated for about 1 hour rendered a completely gelled dessert.

EXAMPLE V

Identical samples of the gelatin dessert concentrate of Example I were prepared, one of which was frozen at 0°F and the other having been stored at room temperature. The samples were allowed to remain undisturbed in their prospective storage areas for 5 months, after which they were evaluated as against a recently prepared sample.

Both samples were spoonable, exhibited no evidence of spoilage such as mold, discoloration, etc. and gelatin desserts prepared therefrom functioned as well in terms of flavor, gelling and solubility properties as the recently prepared sample of concentrate. The water-activity (Aw) of the product measured 0.83 and was within the range of stability for shelf-stable, soft-moist products. To prevent the development of mold on the surface, anti-mycotic agents such as potassium sorbate were added.

A 3:5 weight ratio of gelatin to glycerine (30:50) was prepared and allowed to stand at room temperature for one hour during which time the same ingredients and concentrations thereof as in Example I were added.

At the completion of the first hour, the entire mixture was allowed to stand for an additional hour at room temperature after mixing the gelatin/glycerol phase and ingredient phase together.

This concentrate was thereafter frozen at 0°F for 24 hours after which two teaspoonsful (30–40g) were added to 100ml hot tap water and stirred until dissolved. One ice cube (about 20g) was then added and the entire mixture stirred until the ice cube melted completely. The sample was then refrigerated (35° – 40°F) for about five minutes at which time a completely gelled ready-to-serve dessert was obtained.

Larger preparations such as two-serving and four-serving units can be prepared by adjusting the quantities of concentrate, hot tap water and ice in proper proportions. Thus, a four-unit preparation was prepared by stirring 160g of concentrate into 360ml hot tap water until dissolved. Six ice cubes (about 120g) were added and the mixture stirred until the ice cubes melted. An edible gel was formed and was ready to serve after only 5 minutes of refrigeration.

Thus, use of the frozen gelatin concentrate in combination with hot tap water and ice cubes resulted in an appreciable decrease in gel set time, further improving the setting time from about 40 minutes to about 5 minutes. By frozen, we mean refrigerated to a temperature which normally solidifies conventional foods such as ice cream, ice, and other frozen foods.

While this invention has been described in terms of specific examples and embodiments, these are intended neither to define the parameters of this invention, nor restrict the scope thereof, but merely to illustrate functional modes of the same.

What is claimed is:

1. A method of producing a thick, stirrable gelatin-based suspension which can be readily cleaved with a spoon for use as a gelatin dessert concentrate that is readily dispersible and soluble in hot tap water and quick-setting on subsequent refrigeration to produce a convenient-to-serve gelatin dessert, which method comprises:
   a. soaking gelatin in a polyhydric alcohol for an initial period of at least one hour to allow the gelatin to become discrete and swollen but prior to assuming a cohesive appearance, the gelatin and polyhydric alcohol being in a respective weight ratio of 5:1 to 1:3;
   b. dry blending sucrose, food acid, flavoring and coloring and mixing these dry ingredients with the gelatin and polyhydric alcohol suspension to form a homogenous mixture;
   c. allowing the homogenous mixture to stand for the purpose of equilibration.

2. The method of claim 1 wherein the gelatin and polyhydric alcohol are in a respective weight ratio of 5:3.

3. The method of claim 2 wherein the polyhydric alcohol is glycerine.

4. The method of claim 1 wherein the dry ingredients are added to the gelatin and polyhydric alcohol suspension during the initial hour of soaking.

5. The method of claim 1 wherein the dry ingredients are added to the gelatin and polyhydric alcohol suspension after the initial hour of soaking.

6. The method of claim 1 wherein the gelatin dessert concentrate is frozen after equilibration.

7. The method of claim 1 wherein the gelatin dessert concentrate is kept at ambient temperatures after equilibration.

8. A thick, stirrable gelatin dessert concentrate which is readily dispersible and soluble in hot tap water and quick-setting to produce a gelatin dessert comprising a mixture of gelatin impregnated with a polyhydric alcohol in combination with sucrose, food acids, flavoring and coloring.

9. The spoonable gelatin dessert concentrate of claim 8 wherein the gelatin and polyhydric alcohol are in a respective weight ratio of about 5:1 to about 1:3.

10. The spoonable gelatin dessert concentrate of claim 9 wherein the gelatin and polyhydric alcohol are in a respective weight ratio of 5:3.

11. The spoonable gelatin dessert concentrate of claim 9 wherein the polyhydric alcohol is glycerine.

* * * * *